US009069842B2

(12) United States Patent
Melby (10) Patent No.: US 9,069,842 B2
(45) Date of Patent: Jun. 30, 2015

(54) ACCESSING DOCUMENTS USING PREDICTIVE WORD SEQUENCES

(75) Inventor: Paul Christian Melby, McLean, VA (US)

(73) Assignee: The MITRE Corporation, McLean, VA (US)

( * ) Notice: Subject to any disclaimer, the term of this patent is extended or adjusted under 35 U.S.C. 154(b) by 570 days.

(21) Appl. No.: 12/892,637

(22) Filed: Sep. 28, 2010

(65) Prior Publication Data

US 2012/0078883 A1    Mar. 29, 2012

(51) Int. Cl.
*G06F 17/30* (2006.01)

(52) U.S. Cl.
CPC ...... *G06F 17/3064* (2013.01); *G06F 17/30648* (2013.01); *G06F 17/30672* (2013.01)

(58) Field of Classification Search
CPC .............. G06F 17/30283; G06F 17/30306; G06F 17/30943; G06F 17/30; G06F 17/30011; G06F 17/30289; G06F 17/30864; G06F 17/30165; G06F 17/30321; G06F 17/30386; G06F 17/30424; G06F 17/30598; G06F 17/3061; G06F 17/30035; G06F 17/30038; G06F 17/30053; G06F 17/30507; G06F 17/30572; G06F 17/3064; G06F 17/30648; G06F 17/30672; G06F 17/30705; G06F 17/30722; G06F 17/10
USPC ................................ 707/722, 750, 769, 776
See application file for complete search history.

(56) References Cited

U.S. PATENT DOCUMENTS

| 6,006,223 | A  | * | 12/1999 | Agrawal et al. | 704/251 |
| 6,463,430 | B1 | * | 10/2002 | Brady et al. | 1/1 |
| 7,711,736 | B2 | * | 5/2010 | Levin | 707/737 |
| 8,078,629 | B2 | * | 12/2011 | Patterson | 707/754 |
| 8,090,880 | B2 | * | 1/2012 | Hasha et al. | 709/251 |
| 8,145,636 | B1 | * | 3/2012 | Jeh et al. | 707/736 |
| 8,280,903 | B2 | * | 10/2012 | Broder et al. | 707/769 |
| 8,290,975 | B2 | * | 10/2012 | Gao et al. | 707/767 |
| 2003/0097375 | A1 | * | 5/2003 | Pennock et al. | 707/104.1 |
| 2006/0173916 | A1 | * | 8/2006 | Verbeck Sibley et al. | 707/104.1 |
| 2008/0004904 | A1 | * | 1/2008 | Tran | 705/2 |
| 2009/0222441 | A1 | * | 9/2009 | Broder et al. | 707/5 |
| 2009/0300014 | A1 | * | 12/2009 | Chakrabarti et al. | 707/6 |
| 2011/0144978 | A1 | * | 6/2011 | Tinkler | 704/10 |

* cited by examiner

*Primary Examiner* — Pierre Vital
*Assistant Examiner* — Andalib Lodhi
(74) *Attorney, Agent, or Firm* — Sterne, Kessler, Goldstein & Fox PLLC (57) ABSTRACT

Methods and systems for accessing documents in document collections using predictive word sequences are disclosed. A method for accessing documents using predictive word sequences include creating a candidate list of word sequences where respective ones of the word sequences comprise one or more elements derived from the document corpus; expanding the candidate list by adding one or more new word sequences, where each new pattern is created by combining one or more elements derived from the document corpus with one of the word sequences currently in the candidate list; determining a predictive power with respect to the subject for respective ones of entries of the candidate list, where the entries include the word sequences and the new word sequences; pruning from the candidate list ones of said entries with the determined predictive power less than a predetermined threshold; and accessing documents from the document corpus based on the pruned candidate list. The expanding of the candidate list can include creating each new pattern as a gapped sequence, where the gapped sequence comprises one of the word sequences and one of said elements separated by zero or more words. Corresponding system and computer readable media embodiments are also disclosed.

21 Claims, 8 Drawing Sheets

# ACCESSING DOCUMENTS USING PREDICTIVE WORD SEQUENCES

STATEMENT REGARDING FEDERALLY SPONSORED RESEARCH AND DEVELOPMENT

This invention was made with government support under DTFA01-01-C-00001 awarded by the Federal Aviation Administration. The government has certain rights in the invention.

BACKGROUND OF THE INVENTION

1. Field of the Invention

The present invention relates generally to document retrieval, and more particularly to the use of predictive word sequences related to a subject in order to access documents from a document collection.

2. Background

Numerous applications require text mining in large document collections. As the availability of digitized document content increases, the importance of efficient methods and systems for text mining, document access, and document retrieving increase. One such application is the text mining or document retrieving of aviation safety records, where numerous aircraft and airport reports are searched to discover various safety related events or concerns.

In many of these applications, a search query is generated and the document collection is searched using the search query to access or retrieve matching documents. The document collection can contain documents that are labeled as well as unlabeled documents. The labeled documents can include partially labeled, fully labeled, or some incorrectly labeled documents. Documents can be manually and/or automatically analyzed and various tags or labels can be assigned to the respective documents to categorize the documents within the collection. A reliable document access system should be able to handle such omissions and inaccuracies in the document collection.

Many conventional approaches address finding highly predictive word sequences to access documents related to a specified subject from document collections. Word sequences constructed from document collections can have high dimensionality, i.e., there may be a large number of word sequences. In order to address issues associated with the high dimensionality of word sequences, many conventional approaches focus on finding the most frequently occurring sequences. While these approaches are useful, in many cases in applications such as accessing or accessing aviation safety reports, there are highly predictive word sequences that relatively rare. Although rare and highly predictive words can often be identified by subject matter experts, such identification requires excessive amounts of manual effort.

Efficient and accurate methods and systems are therefore desired for accessing documents based on constructed word sequences.

SUMMARY OF THE INVENTION

Methods and systems for accessing documents in document collections using predictive word sequences are disclosed. According to an embodiment, a method for accessing documents using predictive word sequences includes creating a candidate list of word sequences where respective ones of the word sequences comprise one or more elements derived from the document corpus; expanding the candidate list by adding one or more new word sequences, where each new pattern is created by combining one or more elements derived from the document corpus with one of the word sequences currently in the candidate list; determining a predictive power with respect to the subject for respective ones of entries of the candidate list, where the entries include the word sequences and the new word sequences; pruning from the candidate list ones of said entries with the determined predictive power less than a predetermined threshold; and accessing documents from the document corpus based on the pruned candidate list. The expanding of the candidate list can include creating each new pattern as a gapped sequence, where the gapped sequence comprises one of the word sequences and one of said elements separated by zero or more words.

Another embodiment is a system for accessing documents related to a subject from a document corpus. The system includes at least one processor, at least one memory, and a word sequence determining and document retrieving module implemented on at least one processor. The memory can be configured to store a candidate list of word sequences. The word sequence determining and document retrieving module includes a word sequence generator configured to: create a candidate list of word sequences, where respective ones of the word sequences include one or more elements derived from the document corpus; expand the candidate list by adding one or more new word sequences, where each new pattern is created by combining one or more elements derived from the document corpus with one of said word sequences; determine a predictive power with respect to the subject for respective ones of entries of the candidate list, where the entries comprise said word sequences and said new word sequences; and prune from the candidate list ones of said entries with the determined predictive power less than a predetermined threshold.

Yet another embodiment is a computer readable media storing instructions where the instructions when executed are adapted to access documents related to a subject from a document corpus with a method including: creating a candidate list of word sequences where respective ones of the word sequences comprise one or more elements derived from the document corpus; expanding the candidate list by adding one or more new word sequences, where each new pattern is created by combining one or more elements derived from the document corpus with one of the word sequences currently in the candidate list; determining a predictive power with respect to the subject for respective ones of entries of the candidate list, where the entries include the word sequences and the new word sequences; pruning from the candidate list ones of said entries with the determined predictive power less than a predetermined threshold; and accessing documents from the document corpus based on the pruned candidate list.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Embodiments of the present invention relate to document mining, document accessing and/or document retrieval using predictive word sequences. More particularly, embodiments of the present invention are directed to methods, systems, and computer program products of constructing predictive word sequences with which document collections can be mined and/or relevant reports located from a large document collection. Embodiments of the present invention advantageously utilize gapped word sequences (i.e., word sequences defined as having identified words at each end and allowing for 0 or more other words in between the identified words) and use the predictive power of the word sequences as a measure with which to prune the list of candidate word sequences in order to address the high dimensionality of the potential word sequences. In particular, according to an embodiment of the present invention, gapped word sequences are generated by iteratively adding one word at a time to each gapped sequence and then filtering based upon predictive power. In the following description, embodiments of the present invention are described with respect to word sequences, and word sequence can include sequences of words, or sequences of other patterns, such as DNA patterns. Teachings in this disclosure are applicable to, but are not limited to, sequences of words and also to sequences of other patterns.

Embodiments of the present invention can be used in many data mining, document access, document retrieval, or other like application that benefits from having predictive search term sequences constructed based on the underlying data collection. An example application is accessing large collections of aviation safety reports. In addition to word sequences that frequently occur in the underlying document collection, embodiments of the present invention also identify word sequences that occur less frequently but which are highly predictive. The teachings of this disclosure are applicable to textual as well as some non-textual applications. For example, the teachings herein can be applicable to applications such as DNA pattern discovery. In the following description, unless specified otherwise, the application document access is intended to encompass one or more of document mining, document retrieval, and document access, without loss of generalization.

Example Method Embodiments

Figure 1:
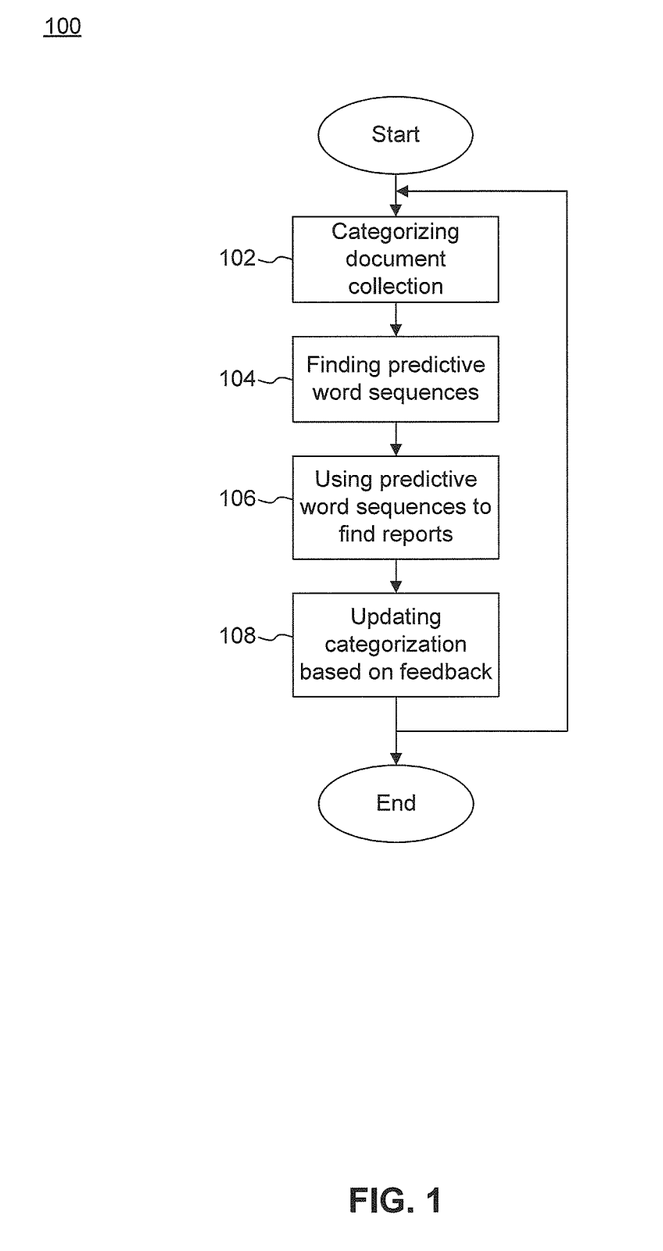
FIG. 1 is a flowchart of a method for accessing documents based on predictive word sequences and for reconfiguring document access or retrieval based on user feedback, according to an embodiment of the present invention.

FIG. 1 illustrates a flowchart of a method 100 for accessing documents from a document collection based upon predictive word sequences, according to an embodiment of the present invention. An example document collection can be a collection of aviation safety reports. The document collection can include documents with one or more structured fields, free text fields, or any combination of structured and free text fields. Aviation safety reports, for example, can include structured fields such as aircraft type and model, age of aircraft, pilot information, and type of safety incident. The aviation safety reports can also include free text fields where the safety incident, aircraft condition, or environmental conditions, and the like, are described in greater detail.

In step 102, according to an embodiment, the documents in the collection are categorized. Categorizing documents can include manually or automatically labeling documents to indicate the relevance of the respective document to a subject of interest. For example, if a subject of interest is a safety infraction identified as "runway incursion", each document that pertains to that safety infraction can be positively marked in a structured field identifying the safety infraction as "runway incursion." The determination to label a document for "runway incursion" may be based on finding the particular phrase in the document. The determination to label a document for "runway incursion" can also be made by a user, such as an aviation expert. When the categorization step 102 is completed, respective documents in the document collection can belong to one of at least two classes or categories with respect to a subject of interest: if the respective document is relevant to the subject of interest and is identified as such, then it is a labeled document with respect to that subject of interest; otherwise, the document is considered unlabeled with respect to that subject of interest.

In step 104, predictive word sequences are found for mining and/or accessing documents from the document collection. The generated word sequences are designed to be predictive of the existence of certain content of interest in the document collection. According to an embodiment, the predictive word sequences are generated corresponding to a subject of interest, for example, specified by a user. A method for generating predictive word sequences is described below in relation to FIG. 2.

In step 106, documents are accessed in the document collection based on the generated list of predictive word sequences. According to an embodiment, the document collection is searched for documents containing one or more of the word sequences. In another embodiment, the one or more of the word sequences from the candidate list can be used to form a query with which to access the document collection for the subject of interest. Finding documents using generated word sequences, according to an embodiment, is described below in relation to FIG. 6.

In step 108, according to an embodiment, updates to the categorization performed in step 102 are received. For example, the documents accessed in step 106 can be reviewed by a user, a determination can be made as to whether the document is relevant to the searched subject of interest, and the categorization of the document can be updated accordingly. According to another embodiment, the review and update process can be automated. The process of updating the document categorization iteratively helps to make the document mining process more efficient over time.

Figure 2:
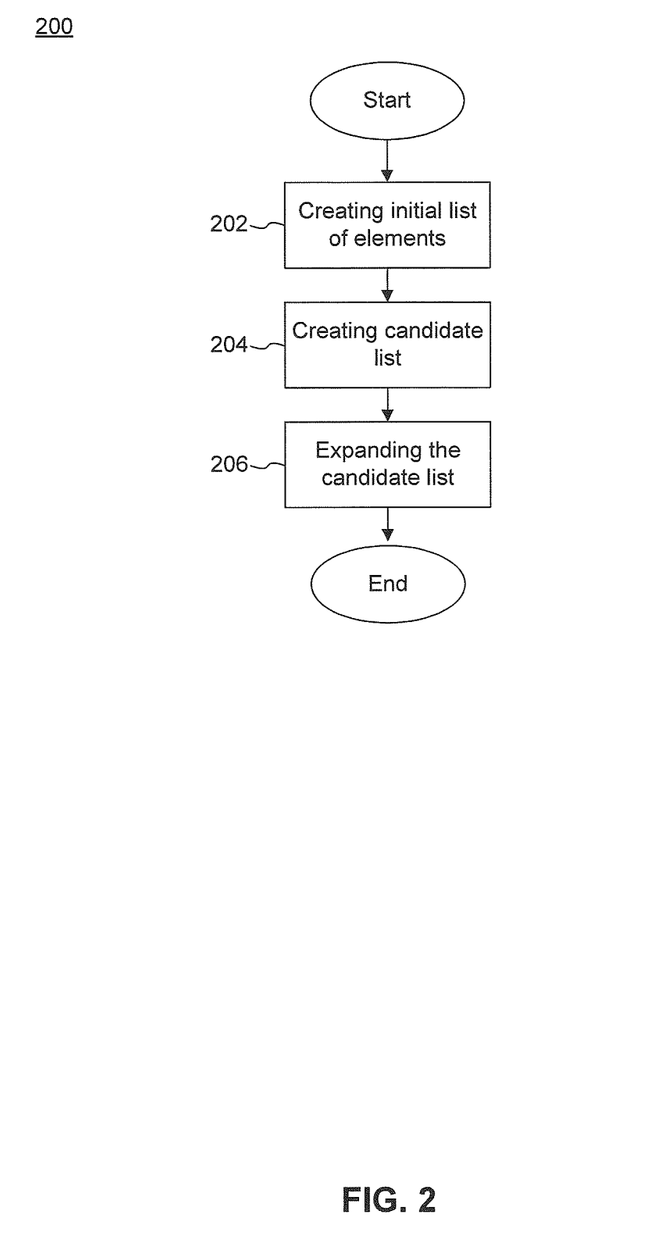
FIG. 2 is a flowchart of a method for creating a list of predictive word sequences, according to an embodiment of the present invention.

FIG. 2 illustrates a method 200 for generating a list of predictive word sequences and for accessing documents based on that list. The word sequences are generated to be predictive of the existence of content related to a particular subject in documents of a document collection. According to an embodiment, one or more steps of method 200 can be used in performing step 102 of method 100.

In step 202, an initial list of elements is generated. The elements can include words or phrases. Without loss of generality, in the description below, the initial list of elements is described as a list of words. According to an embodiment, the initial list of elements is based upon all words that are found in the document collection. Creation of the initial list of elements is described below in relation to FIG. 3.

In step 204, the candidate list of word sequences is created and initialized. The candidate list includes word sequences, including gapped word sequences, which can be used to search or mine the document collection. The candidate list is created based upon the initial list of elements. According to an embodiment, one or more subjects of interest can also be considered when creating the candidate list of word sequences. The creation of the candidate list is described below in relation to FIG. 4.

In step 206, the candidate list of word sequences is expanded. The expansion of the candidate list of word sequences is intended to discover additional word sequences that have a high predictive power about the one or more subjects of interest. According to an embodiment, each of the word sequences in the candidate list is iteratively expanded until a maximum length is reached for the word sequences. In each iteration, respective word sequences in the candidate list are appended and/or pre-pended with selected words from the initial list of elements to generate new word sequences. The new word sequences are evaluated for their predictive power. According to some embodiments, the new word sequences are also evaluated for their frequency of occurrence in the document collection. Based on its predictive power and/or frequency of occurrence, respective new word sequences can be added to the candidate list. Expanding the candidate list of word sequences is described below in relation to FIG. 5. Subsequent to step 206, the generated candidate list can be used to access documents in a document collection.

Figure 3:
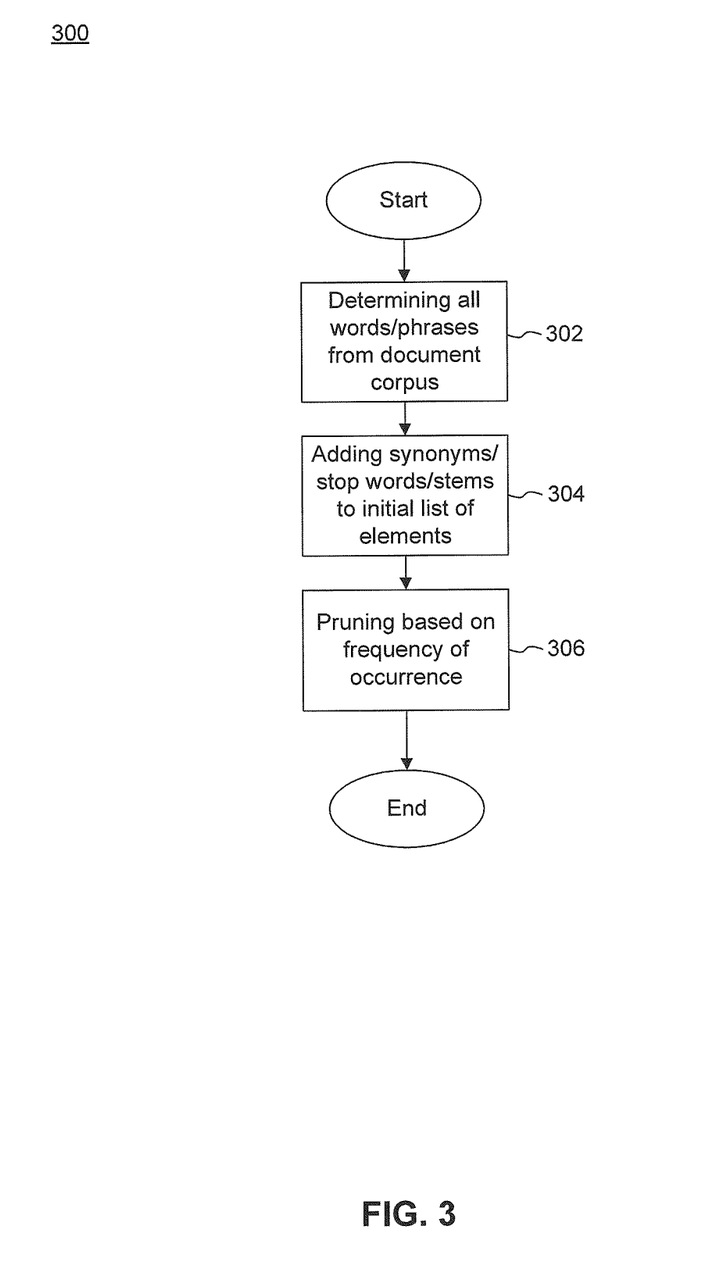
FIG. 3 is a flowchart of a method of creating an initial list of elements for predictive word sequence generation, according to an embodiment of the present invention.

FIG. 3 illustrates a method 300 for creating the initial list of elements according to an embodiment of the present invention. The initial list of elements, as described above, can include words and/or phrases.

In step 302, the document collection is analyzed to determine all unique words contained in it. Having collected a list of all the unique words contained in the document collection, the list can be optionally processed to remove words that do not adequately differentiate. In an embodiment, words such as prepositions and adjectives can be removed from the initial list of elements, in order to trim the list. In some embodiments, phrases, such as common phrases like "wide-body aircraft", occurring in the collection can also be included in the initial list of elements. According to an embodiment, all unique words from the document collection are included in the initial list of elements.

In step 304, for each word included in the initial list of elements, one or more synonyms are added to the initial list of elements. According to some embodiments, stop words and/or stemmed words corresponding to respective words in the initial list of elements are also added.

In step 306, the frequency of occurrence of that word in the document collection is determined. The frequency of occurrence of a word is determined by counting the number of occurrences of that word is found in the document collection. Based on the respective frequencies of occurrence, each word is evaluated as to whether it should remain in the initial list of elements. According to an embodiment, words that have a frequency of occurrence that is below a predetermined threshold are removed from the initial list of elements.

The threshold for frequency of occurrence can be configured considering various factors, such as the type of document collection and the type of subjects of interest. In document collections such as aviation safety reports, certain significant safety infractions occur extremely rarely and the terms describing such rare safety infractions may be pruned from the initial list if the threshold is set too high. On the other hand, setting the threshold too low can include substantial numbers of irrelevant documents and thus increase the costs associated with storing and searching the collection. Embodiments of the present invention can set a relatively low threshold as a minimum frequency of occurrence, for example, due to the use of predictive power as a pruning measure. In an embodiment, for example, a minimum frequency of occurrence threshold can be set between 3-5 occurrences.

Figure 4:
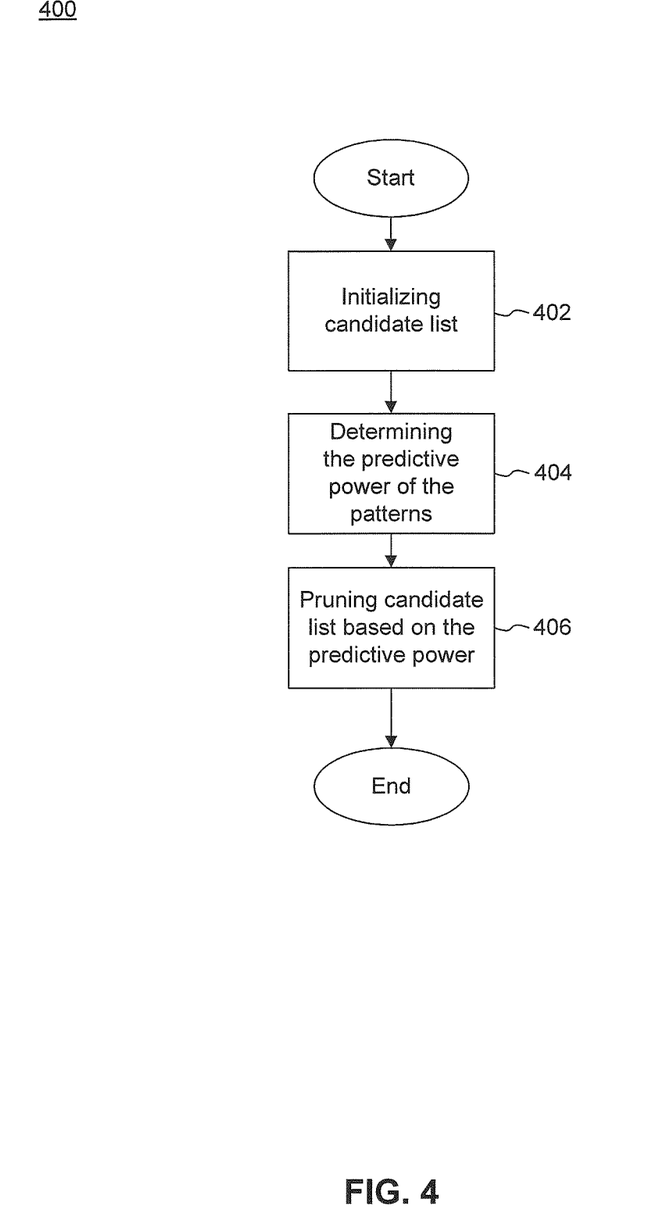
FIG. 4 is a flowchart of a method creating a candidate list of predictive word sequences, according to an embodiment of the present invention.

FIG. 4 illustrates a method 400 for creating the candidate list of predictive word sequences according to an embodiment of the present invention. As described above, the candidate list includes word sequences based upon which the document collection is to be searched.

In step 402, the candidate list of word sequences is initialized. According to an embodiment, the candidate list can be initialized by adding one or more words or phrases relevant to a particular subject of interest. For example, a user can specify one or more words that are relevant to the subject of interest. In an embodiment, the one or more words or phrases can be selected from the initial list of elements. According to another embodiment, a user can specify one or more words via a user interface designed to prompt the user for inputs corresponding to one or more structured fields that appear at least in some documents in the document collection that is to be searched. According to yet another embodiment, the candidate list can be initialized by adding each word in the initial list of elements as a respective word sequence.

In step 404, the predictive power of word sequences in the candidate list is determined. The predictive power of a word sequence in relation to a particular subject is a measure of the effectiveness of that word sequence to find documents that pertain to the subject within a document collection. Determining the predictive power of word sequences with respect to a subject of interest facilitates the selection of word sequences that are most likely to be found in documents containing the most relevant information. In many instances, specific word sequences exist in documents that pertain to the subject of interest, as well as in documents that do not. According to an embodiment, the predictive power is measured using the information gain (IG). Measures of predictive power, in particular IG, are can be used to determine a set of word sequences that can locate documents most relevant to a subject of interest despite many of the respective word sequences in the set being found in relevant documents as well as in irrelevant documents. In embodiments of the present invention, the IG is determined for respective word sequences in the candidate list including gapped word sequences and other word sequences. Other measures of predictive power, such as, but not limited to, F-measure or lift can also be used to prune the candidate list of entries.

According to an embodiment, the predictive power is measured using an IG measure constructed based upon Shannon Entropy. For example, the IG of a word sequence is determined using (1) or (2) below. (1) illustrates the computation of IG. According to an embodiment, however, IG can be calculated based on (2) which provides the relative information gain which is enables a normalized measure of IG over different subjects of interest.

$$IG = B - B_{(knowing\ word\ in\ doc\ or\ not)} \quad (1)$$

$$IG_{relative} = \frac{B - B_{(knowing\ word\ in\ doc\ or\ not)}}{B} \quad (2)$$

where B is defined as:

$$B = H \times N \quad (3)$$

where N is the number of documents in the collection, and H is the Shannon entropy measure, $$H = \sum_i -p(i)\log_2(i) \quad (4)$$

H represents the cost to indicate the class label for each of the documents in the document collection. H is a summation of the individual entropy terms over the two classes, i.e., a first class where the document in the collection is relevant to the safety topic, and a second class where the document in the collection is not relevant to the safety topic. For example, if the subject of interest is "runway incursion" and 10% of the documents are labeled as "runway incursion" and the other 90% are not, then H=−0.1*log$_2$(0.1)−0.9*log$_2$(0.9).

$B_{(knowing\ word\ in\ document\ or\ not)}$ is defined as:

$$B_{(knowing\ word\ in\ doc\ or\ not)} = H_{(word\ in\ doc)} \times N_{(word\ in\ doc)} + H_{(word\ not\ in\ doc)} \times N_{(word\ not\ in\ doc)} \quad (5)$$

$B_{(knowing\ word\ in\ doc\ or\ not)}$ represents the total entropy attributed to a particular subject in relation to a particular word sequence. For example, the total entropy associated with subject "runway incursion" in relation to word sequence "crossed line" can be expressed as the weighted average of the entropy of "runway incursion" when considering only documents containing the word sequence "crossed line" and documents that do not contain "crossed line." $H_{(word\ in\ doc)}$ and $H_{(word\ not\ in\ doc)}$ can be calculated as in (6) and (7). $N_{(word\ in\ doc)}$ and $N_{(word\ not\ in\ doc)}$, represents the number of documents having the particular term (e.g., "crossed line"), and those that do not.

$$H_{(word\ in\ doc)} = \sum_i -p(i\,|\,(word\ in\ doc))\log_2(i\,|\,(word\ in\ doc)) \quad (6)$$

$$H_{(word\ not\ in\ doc)} = \sum_i -p(i\,|\,(word\ not\ in\ doc))\log_2(i\,|\,(word\ not\ in\ doc)) \quad (7)$$

In relation to a subject, such as "runway incursion," $H_{(word\ in\ doc)}$ represents the entropy in relation to documents which include a particular term, say "crossed line," also being labeled as "runway incursion." For example, of the documents that have the word sequence "crossed line" in them, 20% of those documents are labeled as "runway incursion" then $H_{(word\ in\ doc)}$=−0.2*log$_2$(0.2)−0.8*log$_2$(0.8). $H_{(word\ not\ in\ doc)}$, correspondingly, represents the entropy in relation to documents which do not include a particular term such as "crossed line," in relation to the subject of interest "runway incursion." For example, if 10% of the documents that do not have the term "crossed line" are labeled as "runway incursion", then $H_{(word\ not\ in\ doc)}$=−0.1*log$_2$(0.1)−0.9*log$_2$(0.9).

In step 406, the candidate list is pruned based on the predictive power of the respective word sequences. According to an embodiment, any word sequences in the candidate list that has a predictive power less than a configured threshold are filtered out from the candidate list. The predictive power threshold can be user configured. According to an embodiment, an information gain measure, such as that defined in (1) or (2) above, can be used for measuring the predictive power of word sequences. A minimum threshold for predictive power can be configured by the user. According to an embodiment, a minimum predictive power of 0.5% was determined to yield desired results.

Figure 5:
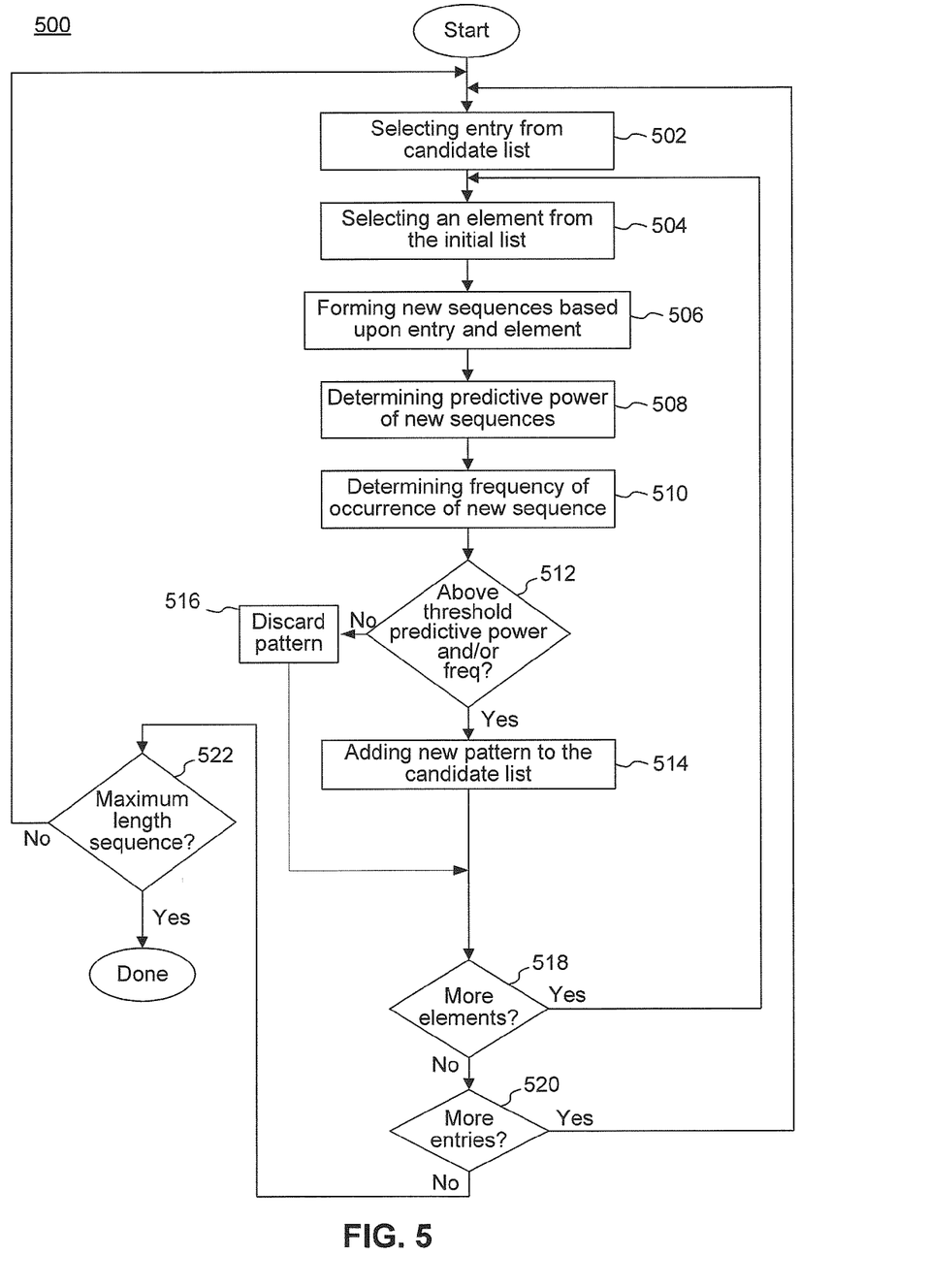
FIG. 5 is a flowchart of a method for expanding a candidate list, according to an embodiment of the present invention.

FIG. 5 illustrates a method 500 to expand the candidate list of word sequences, according to an embodiment of the present invention. The candidate list can be expanded iteratively by adding a word or phrase from the initial list of elements to one or more of the candidate word sequences in each iteration. The resulting added new candidate phrase can be considered a gapped candidate phrase, where 0 or more intervening words can exist between the previous candidate word sequence and the newly added word or phrase.

In step 502, an entry from the candidate list is selected for expansion. According to an embodiment, the entries in the candidate list can be processed in sequence. According to another embodiment, only some of the entries, such as the entries with the shortest length, are selected in each iteration.

In step 504, an element from the initial list of elements is picked with which to expand the selected entry from the candidate list. According to an embodiment, elements are selected in sequence from the initial list of elements. For example, the next word or phrase in the initial list of elements can be picked for the current iteration.

In step 506, new word sequences are formed based on the selected word sequence from the candidate list and the selected element from the initial list of elements. The new word sequences can be gapped word sequences. A gapped word sequence, as described above, can have the selected element located before or after the selected word sequence with 0 or more intervening words. According to an embodiment, in the current iteration, one or more new gapped word sequences containing the selected word sequence and the selected element are added to the candidate list. According to an embodiment, two word sequences are added, one in which the selected element appears before the selected word sequence, and another in which the selected element appears after the selected word sequence. Each of the added new word sequences are considered as gapped word sequences in which the gap between the selected word sequence and the selected element can be 0 to a number of words. A predetermined maximum word sequence length can determine the maximum length of the gap between the selected word sequence and the selected element in the gapped sequence.

In step 508, the predictive power of the new word sequences are determined. According to an embodiment, the predictive power of the new word sequences can be determined as the summation of the predictive power determined for each respective instance of the gapped word sequence in which the new word sequence considered includes 0 or more intermediate words between the selected word sequence and the selected element. According to another embodiment, another statistical measure, such as, but not limited to the average of the respective predictive powers can be used to represent the predictive power of the newly added word sequence. As described above, according to an embodiment, the predictive power for a word sequence can be determined based on (1) or (2) above.

In step 510, the frequency of occurrence of the newly added word sequence is determined. According to an embodiment, as described above, the frequency of occurrence of a word sequence can be determined by determining the number of times the word sequence occurs in the document collection to be accessed or, alternatively, by determining the number of documents in the document collection that the word sequence occurs in.

In step 512, one or more decisions are made as to whether the newly added word sequence meets thresholds regarding one or more of a frequency or occurrence and a predictive power. According to an embodiment, if the newly added word sequence has a predictive power above a predetermined minimum predictive power, and if the newly added word sequence has a frequency of occurrence above a predetermined minimum frequency of occurrence, then the newly added word sequence is considered sufficiently qualified to remain in the candidate list, and the processing proceeds to step 514.

If, in step 512, the newly added word sequence has a frequency of occurrence or a predictive power less than a respective predetermined threshold, then the newly added word sequence is removed from the candidate list in step 516, and the processing proceeds to step 516. In embodiments of the present invention, various combinations of the minimum thresholds for the frequency of occurrence and the predictive power can be combined in making the decision to keep or discard the newly added word sequence from the candidate list. For example, according to an embodiment, the thresholds can be combined in a sliding scale or a weighted average of the respective thresholds, so that the decision to keep or discard the newly added word sequence can be based on a dynamically determined combined threshold associated with both a minimum frequency of occurrence threshold and a minimum predictive power threshold.

Steps 506-512, as described above, determine whether the newly added word sequence is to be kept in the candidate list or whether it should be removed. This determination as to whether the newly added word sequence should remain in the list can be based on one or more other considerations too, in addition to one or more of the frequency of occurrence and predictive power as described above.

A person of skill in the art would also appreciate that the steps 506-512 can be performed in a number of sequences consistent with the teachings of this disclosure. For example, the frequency of occurrence of the term can be determined and the newly added word sequence can be kept in the candidate list or removed, based on the comparison of the determined frequency of occurrence to a predetermined minimum frequency of occurrence. Performing a filtering based on the frequency of occurrence before determining the predictive power, for example, can result in improved efficiencies due to reduced instances in which the more computationally intensive predictive power determination is to be implemented.

If, in step 512 it was decided to keep the newly added word sequence in the candidate list, then that word sequence is added to the candidate list in step 514. According to an embodiment, two word sequences corresponding to the selected word sequence and the selected element are added to the candidate list. The first word sequence added to the list is a gapped sequence having the selected element occurring before the selected word sequence, and the second word sequence having the selected element occurring after the selected word sequence. In another embodiment, one word sequence can be added to represent all gapped word sequences with 0 or more words between the selected element and the selected word sequence. In yet another embodiment, the gapped sequences with 0 or more words between the selected element and the selected word sequence can be expanded and each of the expanded word sequences (i.e., non-gapped) can be added to the candidate list.

In step 518, it is determined if there are any more elements in the initial list of elements, with which to generate potential candidate word sequences. If yes, processing proceeds to step 504 to select another element from the initial list of elements. Otherwise, with respect to the selected word sequence, it is determined that all to be determined potential candidate word sequences have been determined, and processing proceeds to step 520.

In step 520, it is determined if there are any more word sequences in the candidate list for which to generate potential candidate word sequences. If yes, processing proceeds to step 502 to select the next word sequence for which to generate potential candidate word sequences. Otherwise, processing proceeds to step 522.

In step 522, it is determined whether the newly added word sequences have reached a maximum length. According to an embodiment, the maximum length is predetermined. For example, a maximum length for word sequences can be configured by a user. According to another embodiment, maximum length is dynamically determined. For example, if in two consecutive iterations of steps 502-522 no new word sequences are added to the candidate list, it can be decided that the word sequences have reached a maximum length. If in step 522, it is determined that the maximum length for word sequences have been reached, then the expanding of the candidate list has been completed and processing is terminated.

Figure 6:
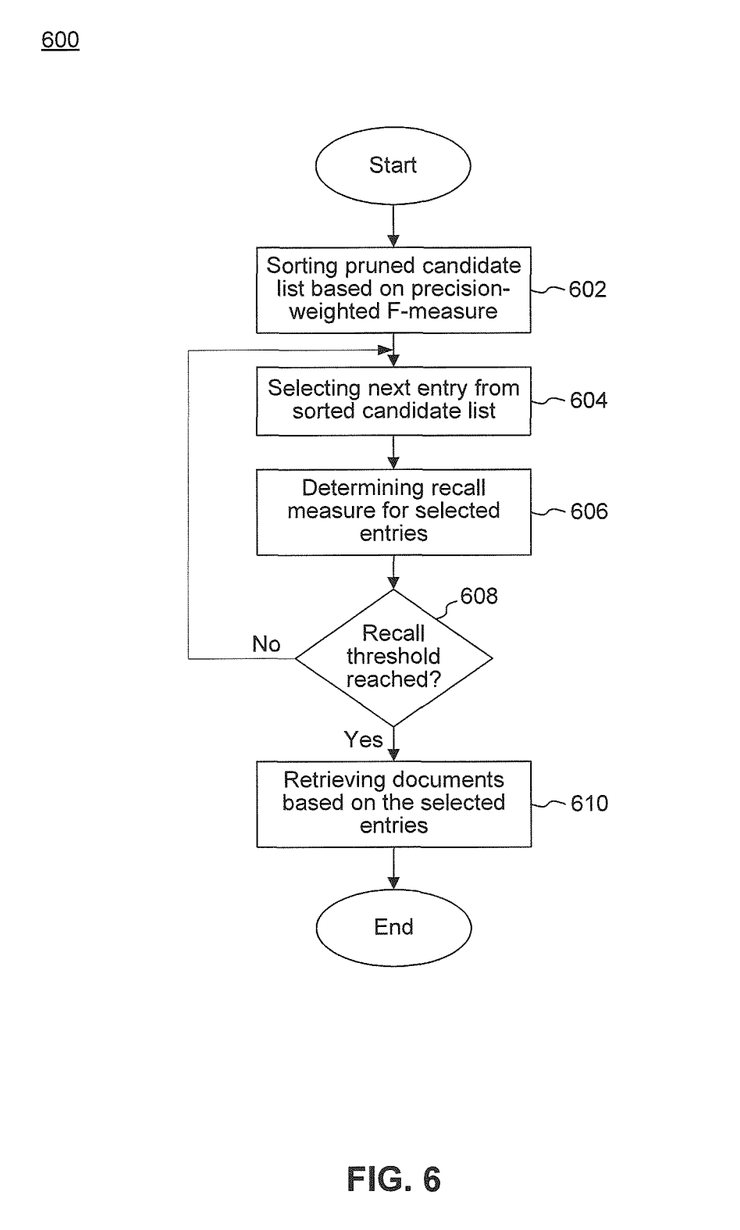
FIG. 6 is a flowchart of a method for accessing documents based on a candidate list of word sequences, according to an embodiment of the present invention.

FIG. 6 illustrates a method 600 for further processing a candidate list of word sequences to determine word sequences using which to access documents from a document collection. Method 600 can be used, for example, to further narrow and prioritize the word sequences in the candidate list expanded using method 500 as described above.

In step 602, the candidate list is sorted in order of precision. According to an embodiment, the candidate list can be sorted based on a precision-weighted F-measure. For example, for each entry in the candidate list, a precision value and a recall value are determined. The precision value P can be determined according to (8) shown below:

$$P = \frac{TP}{TP + FP} \quad (8)$$

Where TP represents the number of true positives, i.e., the number of documents in which the respective word sequence is found in a document that is relevant to the subject of interest. FP represents the number of false positives, i.e., the number of documents in which the respective word sequence is found, but the document is not relevant to the subject of interest.

The recall value R can be determined according to (9) shown below:

$$R = \frac{TP}{TP + FN} \qquad (9)$$

Where TP is as defined with respect to (8) above, and FN represents the number of false negatives, i.e., the number of documents that are relevant to the subject of interest but that do not contain the word sequence.

The precision-weighted F-measure $F_\alpha$ can be determined according to (10) illustrated below:

$$F_\alpha = \frac{(1 + \alpha) \times R \times P}{(R + \alpha \times P)} \qquad (10)$$

Where $\alpha$ represents the weighting between precision and recall. According to an embodiment, alpha can be predetermined. When no weighting is to be assigned, $\alpha = 1$.

Steps 604-608, iteratively select word sequences from the sorted candidate list until a predetermined recall threshold is reached. According to an embodiment, in step 604, the next entry from the sorted candidate list in sequence starting with the word sequence with the highest precision-weighted F-measure is selected.

In step 606, the recall of the selected sorted word sequence is determined. According to an embodiment, the recall can be determined according to (9) shown above.

In step 608, recall values of the selected sorted word sequences are determined where recall is calculating (9) shown above but using the occurrence of any of the word sequences in the selected word sequence list as the criteria for determining true positives and false positives. If, in step 608, it is determined that the combined recall of the selected word sequence list is less than a predetermined minimum recall threshold, then processing returns to step 604 to select the next word sequence from the sorted candidate list. If, in step 608, it is determined that the combined recall of the selected word sequence list has reached the predetermined minimum recall threshold, processing proceeds to step 610.

In step 610, the entries from the sorted candidate list selected using steps 604-608 are used to access documents from the document collection. According to an embodiment, the selected entries from the sorted candidate list are combined into a single query using which the document collection is queried in order to access documents.

Example System Embodiments

Figure 7:
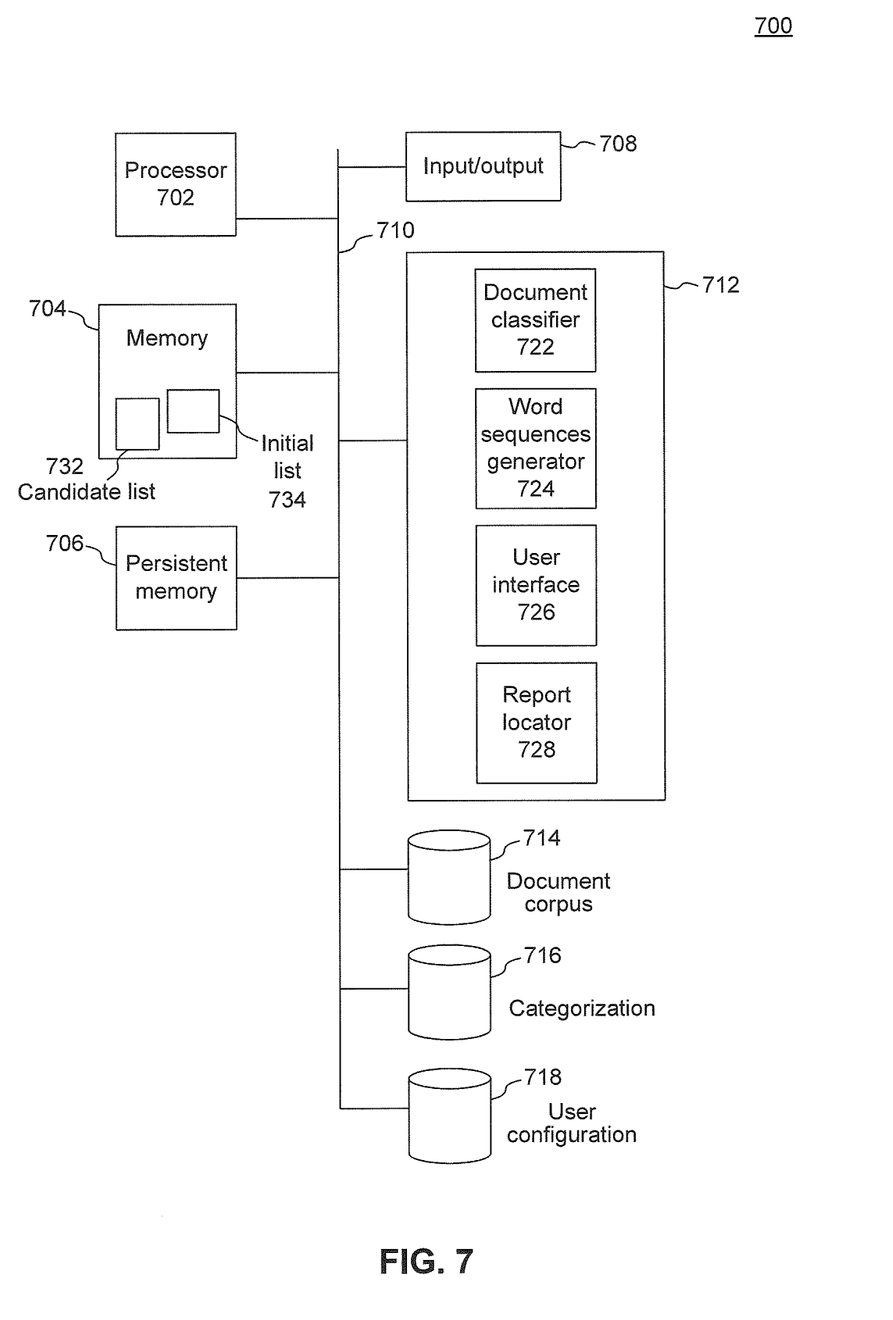
FIG. 7 is a system for accessing documents using word sequences, according to an embodiment of the present invention.

FIG. 7 illustrates a system 700 for accessing documents using word sequences, according to an embodiment of the present invention. For example, system 700 can perform methods 100-600 described above to determine highly predictive word sequences with which to search a document collection for document accessing.

System 700 comprises a processor 702, a volatile memory 704, a persistent memory 706, an input/output interface 708, a communication infrastructure 710, and word sequence determining and document retrieval logic 712. According to embodiments, system 700 can further include a document corpus 714, a categorization of the document corpus 716, and user configurations 718.

Processor 702 can be one or more processors configured to execute logic, including word sequence determining and document retrieval logic 712. Volatile memory 704 includes a memory such as dynamic random access memory (DRAM) or like memory. Persistent memory 706 can include a hard disk, flash memory, and other non-volatile memory devices. Input/output interface 708 can include one or more interfaces to communication networks, input devices, output devices, and storage devices. Communication infrastructure 710 can include one or more communication buses, such as peripheral component interface (PCI) bus, Firewire, and the like.

According to an embodiment, memory 704 includes a candidate list 732. Memory 704 can in addition include an initial list of elements 734. Candidate list 732 is a list generated by word sequence determining and document retrieval logic 712 and comprises word sequences with which to access the document collection in relation to a subject of interest. Initial list of elements 734 is a list generated by word sequence determining and document retrieval logic 712 and is based on words and phrases found in the document collection.

Word sequence determining and document retrieval logic 712 can comprise a document classifier 722, a word sequence generator 724, a user interface 726, and a report locator 728. Document classifier 722 includes logic to classify documents in a document collection. The document classification can include labeling respective documents according to their content. For example, in a system for document accessing for documents related to aviation safety records, one or more structured fields can be predetermined which, when filled out manually by an operator or automatically, describes the content of each document.

Word sequence generator 724 includes logic to generate a list of word sequences based on which to perform the document accessing. According to an embodiment, word sequence generator performs some or all of the logic of method 100 described above.

User interface 726 provides an interface using which the system can be refined as it is being used. User interface 726, for example, can include functionality to display the results of the word list generation and document access to the user. User interface 726 can also include functionality to accept input from user regarding the categorization of the documents. User input indicating whether categorizations (or the values in structured fields) are accurate or any modifications to such categorizations or structured fields can be used to improve the categorization over time, and consequently to improve the precision and recall of the document accessing system.

Report locator 728 includes the functionality to find and access documents that correspond to a generated set of word sequences, according to an embodiment of the present invention. For example, report locator 728 can include the logic to access a data collection using a candidate list of word sequences generated using method 100 as described above.

Document corpus 714 can include a document collection accessible to word sequence determining and document accessing logic 712. The document collection comprises documents in digitized form, some or all of which may be associated with one or more structured data fields.

Document categorization database 716 includes respective documents and/or an index to documents, representing a categorization of documents in the document collection, according to an embodiment of the present invention. For example, document categorization database 716 can comprise of an index that, for each document in the document collection, indicates one or more structured fields and associated values for each of the structured fields.

User configuration database 718 includes one or more configuration parameters associated with system 700. For example, user configuration database 718 includes user configured parameters such as a minimum frequency of occurrence threshold, a minimum predictive power threshold, a maximum length for word sequences, and a minimum recall threshold.

One or more of the modules 712-718 and 722-728, may be implemented using a programming language, such as, for example, C, assembly, or Java. One or more of the modules 712-718 and 722-728 may also be implemented using hardware components, such as, for example, a field programmable gate array (FPGA) or a digital signal processor (DSP). Modules 712-718 and 722-728 may be co-located on a single platform, or on multiple interconnected platforms.

Figure 8:
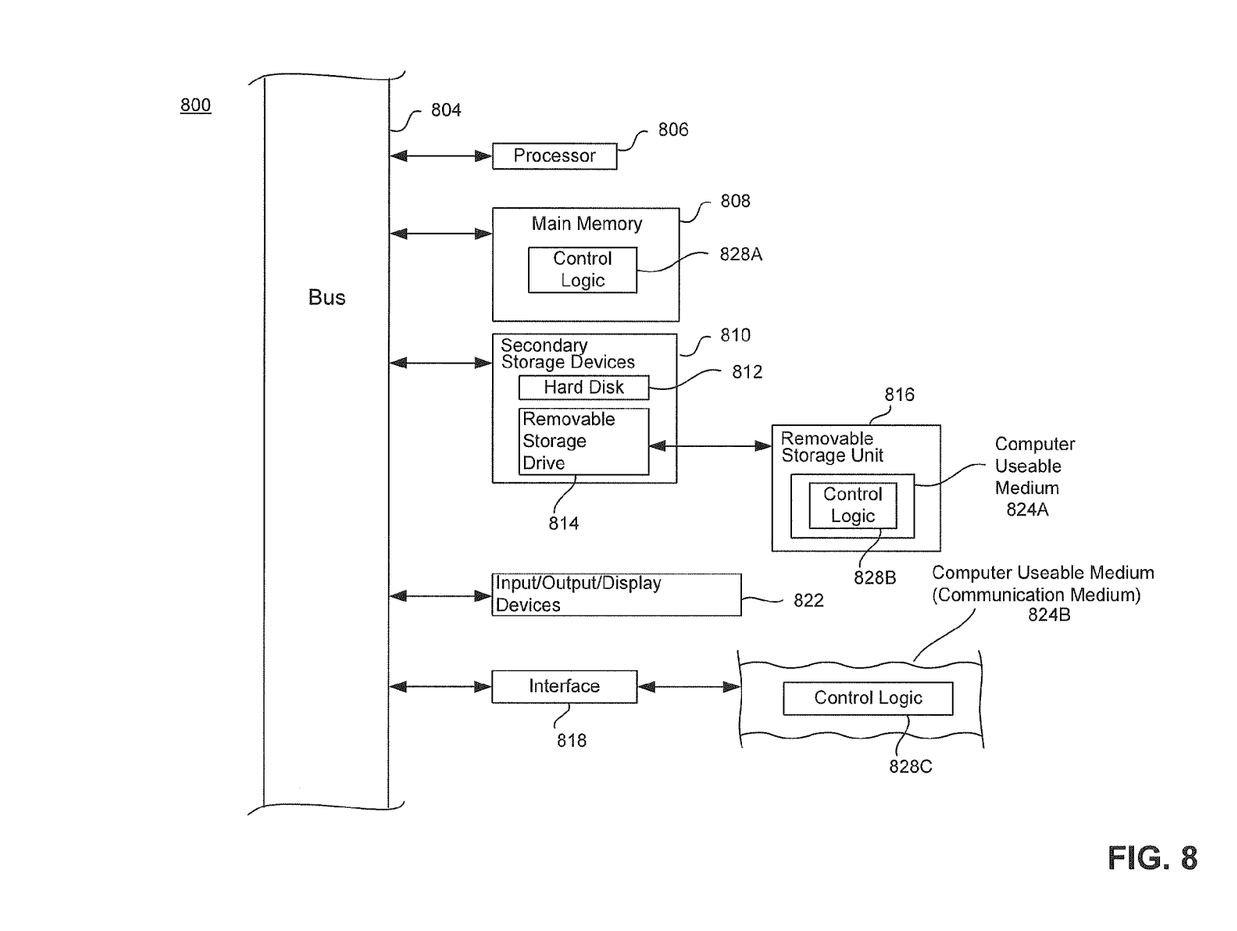
FIG. 8 is a system for accessing documents using word sequences, according to an embodiment of the present invention.

In another embodiment of the present invention, the system and components of embodiments of the present invention described herein are implemented using well known computers, such as computer 800 shown in FIG. 8. For example, document retrieval system 700 can be implemented using computer(s) 800.

The computer 800 includes one or more processors (also called central processing units, or CPUs), such as a processor 806. The processor 806 is connected to a communication bus 804.

The computer 802 also includes a main or primary memory 808, such as random access memory (RAM). The primary memory 808 has stored therein control logic 828A (computer software), and data.

The computer 1302 may also include one or more secondary storage devices 810. The secondary storage devices 810 include, for example, a hard disk drive 812 and/or a removable storage device or drive 814, as well as other types of storage devices, such as memory cards and memory sticks. The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. The removable storage drive 814 reads from and/or writes to the removable storage unit 816 in a well known manner.

The computer 802 may also include input/output/display devices 822, such as monitors, keyboards, pointing devices, etc.

The computer 802 further includes at least one communication or network interface 818. The communication or network interface 818 enables the computer 802 to communicate with remote devices. For example, the communication or network interface 818 allows the computer 802 to communicate over communication networks or mediums 824B (representing a form of a computer useable or readable medium), such as LANs, WANs, the Internet, etc. The communication or network interface 1318 may interface with remote sites or networks via wired or wireless connections. The communication or network interface 818 may also enable the computer 802 to communicate with other devices on the same platform, using wired or wireless mechanisms.

Control logic 828C may be transmitted to and from the computer 802 via the communication medium 824B.

Any apparatus or manufacture comprising a computer useable or readable medium having control logic (software) stored therein is referred to herein as a computer program product or program storage device. This includes, but is not limited to, the computer 802, the main memory 808, secondary storage devices 810, and the removable storage unit 816. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for accessing documents related to a subject from a document corpus, comprising:
    categorizing documents from the document corpus based on one or more subjects;
    creating a candidate list of word sequences, wherein respective ones of the word sequences comprise one or more elements derived from the document corpus;
    expanding the candidate list by adding one or more new word patterns, wherein each new pattern comprises a gapped sequence created by combining one or more elements derived from the document corpus with one of said word sequences;

determining a predictive power with respect to the subject for respective ones of entries of the candidate list, wherein the entries comprise said word sequences and said new word patterns;

pruning from the candidate list ones of said entries with the determined predictive power less than a predetermined threshold, wherein the predictive power comprises a measure of information gain, and wherein the pruning further comprises pruning from the candidate list ones of said entries with a frequency of occurrence less than a predetermined frequency threshold;

accessing documents from the document corpus based on the pruned candidate list;

updating the categorization of documents based on the accessing; and iteratively performing the expanding, the determining the predictive power, and the pruning, for increasing entry lengths until at least one of the entries is of a predetermined length.

2. The method of claim 1, wherein the gapped sequence comprises one of the word sequences and one of said elements separated by zero or more words.

3. The method of claim 2, wherein a maximum length of the gapped sequence is predetermined.

4. The method of claim 2, wherein the creating said each new pattern as a gapped sequence includes:
creating a first new pattern by pre-pending one of the word sequences with a first element from the document corpus; and
creating a second new pattern by appending one of the word sequences with the first element.

5. The method of claim 2, wherein the gapped sequence comprises one of the word sequences and a word from the document corpus separated by zero or more words.

6. The method of claim 1, further comprising:
iteratively performing the expanding, the determining the predictive power, and the pruning, until at least one of the entries is of a maximum length.

7. The method of claim 1, further comprising:
iteratively performing the expanding, the determining the predictive power, and the pruning, until at least one of the entries is of a predetermined length.

8. The method of claim 1, further comprising:
creating an initial list of elements including words or phrases.

9. The method of claim 8, wherein the creating the initial list comprises:
determining a set of phrases including words or phrases from the document corpus; and
adding each of said phrases as one of said elements in the initial list.

10. The method of claim 9, wherein the set of phrases comprises substantially all unique words contained in the document corpus.

11. The method of claim 9, wherein the creating the initial list further comprises:
adding, to the initial list, one or more of synonyms, stop-words or stemmed words for respective ones of said phrases.

12. The method of claim 9, wherein the creating the initial list further comprises:
pruning, from the initial list, phrases having a frequency of occurrence in the document corpus which is less than a predetermined frequency threshold.

13. The method of claim 1, further comprising:
accessing the document corpus;
determining positive labeled documents with respect to the subject in the document corpus; and
calculating, for respective one of said word sequences, the predictive power based upon a presence of the respective entry in the positive labeled documents.

14. The method of claim 1, wherein the creating the candidate list comprises:
determining the predictive power of respective ones of the word sequences; and
pruning from the candidate list ones of said word sequences with the determined predictive power less than a predetermined threshold.

15. The method of claim 1, further comprising:
pruning, from the candidate list, said entries having a frequency of occurrence in the document corpus which is less than a predetermined frequency threshold.

16. The method of claim 1, the accessing further comprising:
removing, from the pruned candidate list, said entries having a precision less than a predetermined precision threshold.

17. The method of claim 1, the accessing comprising:
sorting the pruned candidate list based on a precision-weighted F-measure;
iteratively adding the entries of the sorted candidate list to a search list until the recall of the search list exceeds a predetermined target recall; and
accessing documents from the document corpus based upon the search list.

18. The method of claim 1, wherein the pruning further comprises pruning from the candidate list ones of said entries with a frequency of occurrence less than a predetermined frequency threshold, and the method further comprising:
iteratively performing the expanding, the determining the predictive power, and the pruning, for increasing entry lengths until at least one of the entries is of a predetermined length.

19. A system for accessing documents related to a subject from a document corpus, comprising:
at least one processor;
at least one memory coupled to the processor and configured to store a candidate list of word sequences; and
a word sequence determining and document accessing module implemented on the at least one processor, including:
a document classifier configured to categorize documents from the document corpus based on one or more subjects;
a word sequence generator configured to:
create a candidate list of word sequences, wherein respective ones of the word sequences comprise one or more elements derived from the document corpus;
expand the candidate list by adding one or more new word patterns, wherein each new pattern comprises a gapped sequence created by combining one or more elements derived from the document corpus with one of said word sequences;
determine a predictive power with respect to the subject for respective ones of entries of the candidate list, wherein the entries comprise said word sequences and said new word patterns;
prune from the candidate list ones of said entries with the determined predictive power less than a predetermined threshold, wherein the predictive power comprises a measure of information gain, and wherein the pruning further comprises pruning from the candidate list ones of said entries with a frequency of occurrence less than a predetermined frequency threshold; and iteratively performing the expanding, the determining the predictive power, and the pruning, for increasing entry lengths until at least one of the entries is of a predetermined length, wherein the document classifier is further configured to:
access the document corpus based on the pruned candidate list; and
update the categorization of documents based on the accessing.

20. The system of claim 19, wherein the document classifier is further configured to:
determine positive labeled documents with respect to the subject in the document corpus; and
calculate, for respective one of said word sequences, the predictive power based upon a presence of the respective entry in the positive labeled documents; and
wherein the word sequence determining and document accessing module further comprises a report locator configured to find documents in the document corpus using the candidate list.

21. A computer readable media storing instructions, wherein said instructions when executed are adapted to access documents related to a subject from a document corpus with a method comprising:

categorizing documents from the document corpus based on one or more subjects;
creating a candidate list of word sequences, wherein respective ones of the word sequences comprise one or more elements derived from the document corpus;
expanding the candidate list by adding one or more new word patterns, wherein each new pattern comprises a gapped sequence created by combining one or more elements derived from the document corpus with one of said word sequences;
determining a predictive power with respect to the subject for respective ones of entries of the candidate list, wherein the entries comprise said word sequences and said new word patterns;
pruning from the candidate list ones of said entries with the determined predictive power less than a predetermined threshold, wherein the predictive power comprises a measure of information gain, and wherein the pruning further comprises pruning from the candidate list ones of said entries with a frequency of occurrence less than a predetermined frequency threshold;
accessing documents from the document corpus based on the pruned candidate list;
updating the categorization of documents based on the accessing; and
iteratively performing the expanding, the determining the predictive power, and the pruning, for increasing entry lengths until at least one of the entries is of a predetermined length.

* * * * *

UNITED STATES PATENT AND TRADEMARK OFFICE
CERTIFICATE OF CORRECTION

| | | |
|---|---|---|
| PATENT NO. | : 9,069,842 B2 | Page 1 of 1 |
| APPLICATION NO. | : 12/892637 | |
| DATED | : June 30, 2015 | |
| INVENTOR(S) | : Paul Christian Melby | |

It is certified that error appears in the above-identified patent and that said Letters Patent is hereby corrected as shown below:

In the claims
In column 16, line 5, replace "respective one" with --respective ones--.
In column 17, line 20, replace "respective one" with --respective ones--.

Signed and Sealed this
Fifteenth Day of December, 2015

Michelle K. Lee
*Director of the United States Patent and Trademark Office*